FIG. 3 A-B

United States Patent Office 3,780,154
Patented Dec. 18, 1973

3,780,154
PROCESS AND APPARATUS FOR THE CONTINUOUS PRODUCTION AND/OR COVERING OF EXTRUDED SECTIONS
Karl Heinz Muller, Leverkusen, Klaus Richter, Cologne-Dellbruck, and Harry Rohr, Leverkusen, Germany, assignors to Bayer Aktiengesellschaft, Leverkusen, Germany
Filed June 15, 1971, Ser. No. 153,303
Claims priority, application Germany, June 20, 1970, P 20 30 578.6
Int. Cl. B28b 3/20
U.S. Cl. 264—176 R                    20 Claims

ABSTRACT OF THE DISCLOSURE

Extruded sections are covered with plasticised synthetic plastics material in an extruder nozzle, by having the plastic synthetic plastics material first of all flowing from outside around the extruder nozzle, then guided opposite to the ejection direction, and then deflected into the duct of the extruder nozzle.

---

The present invention is concerned with a process and apparatus for the continuous production and/or covering of extruded sections, in which a plasticised synthetic plastics material is supplied to an extruder nozzle and is forced out through the said nozzle. In the invention, use is made of a plasticising conveying device, following which there is arranged an extruder nozzle.

When manufacturing extruded sections, it is very important that the flow of synthetic plastics composition from the plasticising device, where it is melted, into the the nozzle duct is laminar as far as possible in order for the section to have the properties, such as strength, and composition over the entire cross-section.

Extruder nozzles used for this purpose may consist, for example, of deflector heads with so-called heart-shaped members, or of extruder nozzles in which torpedoes are arranged. These extruder nozzles are relatively difficult to make and are not suitable for all materials which are to be extruded. When using thermoplastic materials having a high melt viscosity, thermoplastic materials with a high pigment content, or foamable synthetic plastics materials, the long travel path between the plasticising device and extruder nozzle is found to be a disadvantage, since the aforementioned materials are subjected to a strong shearing action during this travel, which has a harmful effect on the properties of the completed section. In particular, with foamable synthetic plastics materials, it is not possible to produce smooth surfaces using the aforementioned arrangements. Since a high pressure is built up in the long travel path, the ejection or production efficiencies of such extruder arrangements are unsatisfactory.

The disadvantages described above also occur when freshly moulded extruded sections are covered with a plasticised synthetic plastics material.

It is the object of the present invention to provide a process and an apparatus which permits very efficient continuous production and/or covering of extruded sections in which the properties of the fabricated extruded section are improved in comparison with the properties produced with the previous processes and apparatus.

According to the invention there is provided a process for the continuous production and/or covering of extruded sections, in which a plasticised synthetic plastics material is supplied to an extruder nozzle and is extruded therethrough, in which the plasticised synthetic plastics material first flows around the extruder nozzle from outside, is then guided in a direction opposite to the direction in which the section is to be extruded, and thereafter is deflected into a duct of the extruder nozzle.

This has the following advantages: As regards construction, the extruder nozzle is short and is capable of being made more easily than the previously known extruder nozzles. Worm extruders are usually used as the plasticising means, and these impart a rotational motion to the plasticised synthetic plastics composition. This rotational motion only decreases slightly during the travel path. Due to the flow around the extruder nozzle before entering the nozzle duct proper, this rotational motion is strongly damped in such a way that there is a substantially laminar flow at the time of entering the nozzle duct. The flow around the extruder nozzle from outside has the additional advantage that the nozzle is thereby kept at a constant temperature and this leads to a uniform production capacity and contributes to a constant quality of the extruded sections.

Using this process, all thermoplastic synthetic plastics materials are suitable for the production of the extruded sections. Such materials include, for example, polyolefines, modified polystyrenes, such as ABS polymers, thermoplastic materials based on cellulose, materials which can be processed thermoplastically, such as polyurethanes, polyamides, polycarbonates, polyvinyl chloride and chlorinated polyvinyl chloride, ethylene vinyl acetates, polyacetal and PVC modified ethylene vinyl acetates.

The aforementioned materials can be provided with a high filling of pigment or can be made foamable by adding suitable chemical or physical blowing agents. Suitable chemical blowing agents include diphenyl-3,3-disulphohydrazide. Suitable physical blowing agents include, for example, hydrocarbon, fluorinated hydrocarbons, argon, nitrogen and carbon dioxide. These blowing agents are made to react by generally known methods.

In one particularly advantageous way of carrying out the process according to the invention, the quantity of plasticised synthetic plastics material supplied to the duct of the extruder nozzle is periodically changed in a manner suitable for the production of extruded sections with periodically variable cross-section. In this way, it is possible to produce extruded sections which have enlargements or constrictions along their axis at certain intervals. Such extruded sections can generally be cut to the required length, usually after extrusion. When cutting extruded sections which have such enlargements or constrictions, care must be taken to match the cutting sequence exactly with the enlargements or constrictions.

As already previously stated, the process according to the invention can also be used for covering extruded sections with plasticised synthetic plastics materials. In accordance with this particular form of the invention, an extruded section which is to be covered is introduced into the extruder nozzle and is covered with the plasticised synthetic plastics material.

Two alternatives are offered for this purpose. In one, the extruded section which is to be covered is introduced as a prefabricated extruded section, which can, for example, be in the form of a wire, rope, tube, band, fabric web, foil or the like. By suitable construction of the device used for carrying out the process, it is also possible to introduce short sections of extruded material.

In the other alternative, the extruded section which is to be covered is extruded immediately before the covering operation, that is to say, both the core section and the covering are processed in one passage in successive steps to form the finished product.

It is to be understood that the extruded section which is to be covered can be covered successively with several layers of plasticised synthetic plastics material in one passage.

The process according to the invention has proved to be particularly advantageous for the manufacture of pencil-like instruments on which a point is to be formed, such as lead pencils, color pencils, eraser pencils, etc. In this case, the lead and the covering are manufactured simultaneously in particularly advantageous manner under very economical conditions. It has been found that a special advantage of this process is that the leads of the pencils thus produced are resistant to breaking.

The apparatus according to the invention for carrying out the process is based on at least one plasticising and conveying arrangement, after which is arranged an extruder nozzle disposed in a housing. Usually, screw extruders with one or more screws are used for this purpose. The plasticising screws then simultaneously constitute the conveying means. The extruder nozzles arranged at the delivery end are usually exchangeable, so that the apparatus can be used for extruded sections of different shapes by exchanging the extruder nozzles.

The novel feature of the apparatus according to the invention is to be seen in the fact that the extruder nozzle is surrounded by an annular duct which is connected at one end to the plasticising arrangement by way of a supply duct and terminates at the other end in an annular slot directed oppositely to the ejection direction of the extruder nozzle, the said slot leading around a deflecting edge on the inlet end of the extrusion press nozzle and opening into the nozzle duct, and being defined by the housing and a mandrel directed axially into the nozzle duct.

This form of construction is particularly advantageous since the flow ducts and slots for the plasticised synthetic plastics material can be produced in both the extruder nozzle and the surrounding housing by machining with a cutting action, such as turning, milling or planing, in contrast to the known apparatus in which the manufacture of the heart-shaped members or torpedoes required particularly costly casting, machining and polishing methods, due to their three-dimensional surfaces. It is advantageous for the cross-section of the annular slot to be adjustable. This adjustability is assured, either by the housing being displaceable relative to the extruder nozzle, or, more advantageously, by mounting the extruder nozzle for axial displacement in the housing. The extruder nozzle may, for example, be provided in this case with a threaded nut which is rotatably mounted in a thread arranged in the housing.

When using the apparatus for covering extruded sections, for example for covering tubes and the like, the mandrel according to the invention comprises a bore for the supply of the extruded section which is to be covered. This bore is adapted to correspond to the cross-section of the extruded section to be guided therethrough. The bore can thus be of any desired cross-section, for example circular, slit-shaped or trapezoidal. Where, for example, a covered, plate-shaped extruded section is to be produced, the mandrel must have a form adapted to this section and to the nozzle inlet and must be interrupted by several bores of the aforesaid type when several prefabricated extruded sections are to be covered.

An embodiment of the apparatus which has proved to be particularly advantageous is one in which the extruded section or sections to be covered are produced by extrusion immediately before the covering operation, this being achieved according to the invention by the bore and the mandrel forming the extruder nozzle of a second extruding arrangement. This latter thus precedes the extruder nozzle previously described and has the advantage that, when a screw extruder is used, the pointed end of the screw, because of the particular shape of the mandrel, is able to extend as far as possible into the extruder nozzle for the covering of the core section. In this way, the flow path for the core material is kept advantageously short. Finally, it is also an advantage to mount the extruder nozzle so that it can be adjusted radially, because when covering extruded sections, it is often important that the section which is to be covered should be held centrally or at a certain distance from one of the surfaces.

Two embodiments of the apparatus according to the invention are shown in purely diagrammatic form in an accompanying drawing and are more fully explained below. In the drawing:

FIG. 3 is a section along the line A–B of FIG. 2.

Figure 1:
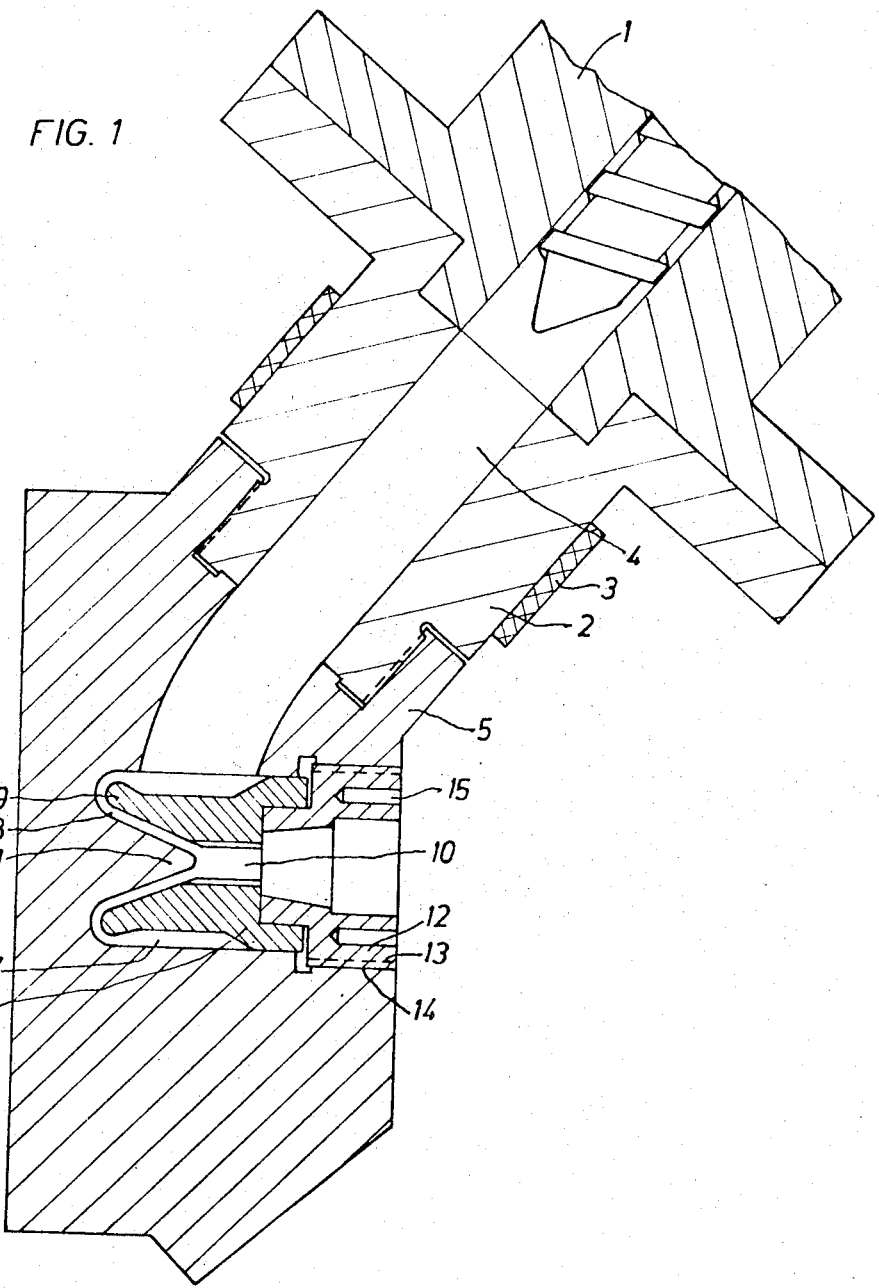
FIG. 1 shows an apparatus for the manufacture of extruded sections.

Molten synthetic plastics material is supplied from a plasticising arrangement 1, which is constructed as a screw extruder, by way of an intermediate member 2, which is provided with heating elements 3 and has a supply duct 4, to a housing 5 in which an extruder nozzle 6 is mounted. The extruder nozzle 6 is enclosed in the region of the outlet end of the supply duct 4 by an annular passage 7, so that the molten material supplied flows externally around the extruder nozzle 6. The annular passage 7 is narrowed opposite to the ejection direction of the extrusion nozzle 6 into an annular slot 8, which is guided around a deflecting edge 9 and is limited on one side by the outlet nozzle and on the other side by the housing 5. The housing 5 projects in the direction of the nozzle duct 10 as a mandrel 11. During its travel from the annular passage 7 through the annular slot 8 into the nozzle duct 10, the flow of the molten plastics material is stabilised, so that the rotational motion imposed thereon, especially by the extruder screw, no longer occurs in the nozzle duct 10. On the ejection side, the extruder nozzle 6 is coupled with a drilled threaded nut 12, the thread 13 of which turns in a cooperating thread 14 arranged in the housing 5. The threaded nut 12 also comprises a plurality of bores 15, into which a special key can be inserted for displacing the extruder nozzle 6, axially so that the annular slot 8 is adjustable.

Figure 2:
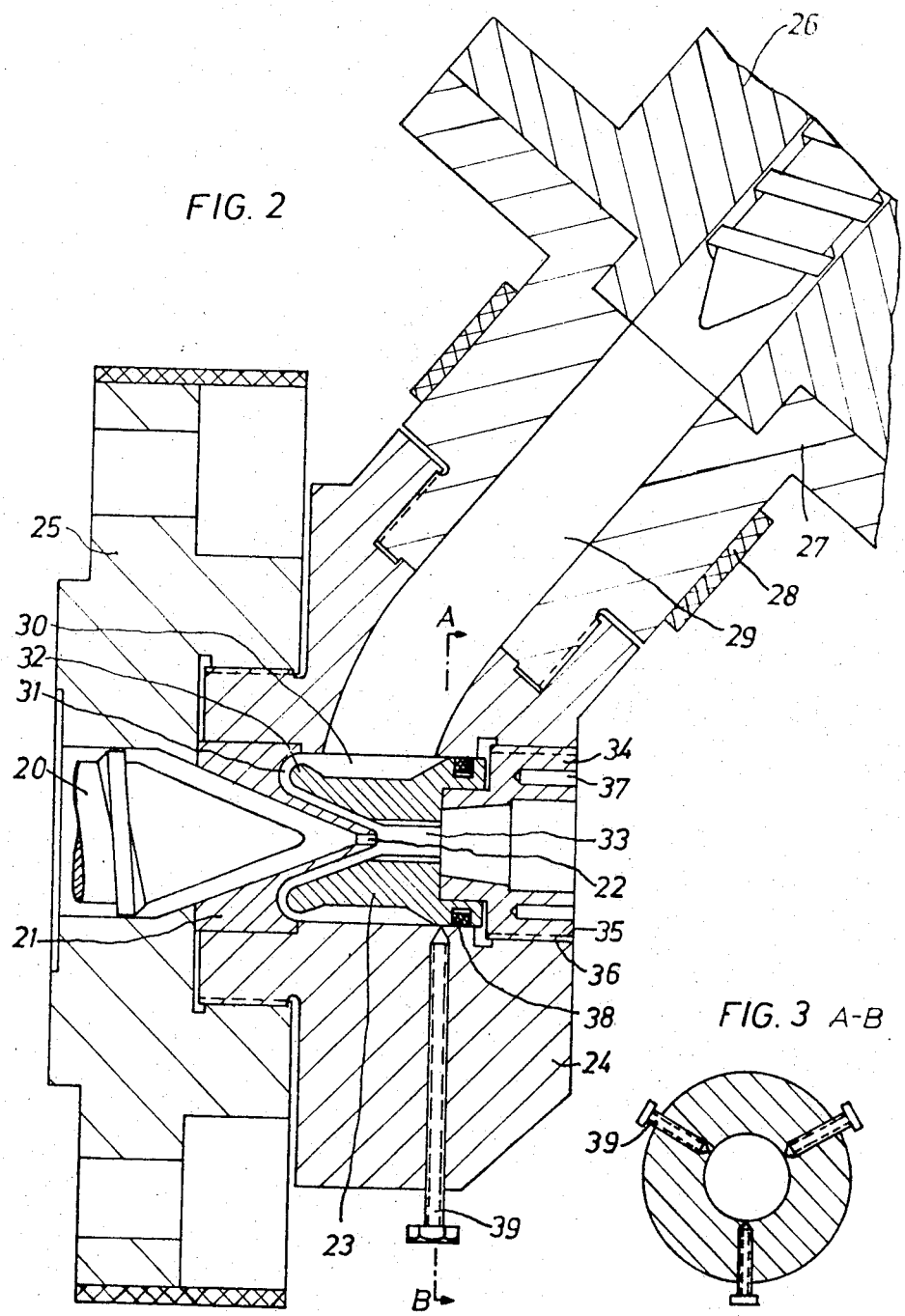
FIG. 2 shows an apparatus for covering prefabricated extruded sections.

Using the apparatus shown in FIG. 2, a pencil lead composition in a screw extruder 20 is forced out through an extruder nozzle 21 with a bore 22, this nozzle 21 being so constructed that it serves at the same time as a mandrel for a second extruder nozzle 23, which follows the nozzle 21 and which is provided for the purpose of covering the pencil lead with a thermoplastic synthetic plastics material. The extruder nozzles 21 and 23 are both mounted in a housing 24, which is fixed in the flange 25. The synthetic plastics material for covering the pencil lead is heated and conveyed in a plasticising arrangement 26 constructed as a screw extruder and passes through an intermediate member 27, which is provided with heating elements 28 and has a supply duct 29, into an annular passage 30 which extends around the extruder nozzle 23.

In this way, the molten synthetic plastics material flows around the extruder nozzle 23, initially from outside, and is forced into an annular slot 31 which follows the annular duct 30 opposite to the ejection direction of the extruder nozzle 23 and is guided around a deflecting edge 32 in the form of a bead. This annular slot is limited on one side by the extrusion nozzle 23 itself and on the other side by the extrusion nozzle 21 which is formed as a mandrel. The manufactured pencil leaves the nozzle duct 33 as a continuous section and is carried away. In this case also the extruder nozzle 23 is provided with a drilled threaded nut 34, the thread 35 of which is mounted in a cooperating thread 36 in the housing 34. Bores 37 serve for the insertion of a special key, so that this threaded nut 34 can be tightened in the thread 35, the extruder nozzle 23 thereby being moved axially. The extrusion press nozzle 23 is sealed off relatively to the wall of the housing 24 by means of a packing ring 38. The extrusion press nozzle 23 can be adjusted radially by means of three adjusting screws 39 offset by 120°, so that it can always be accurately centered relatively to the axis of the extruder nozzle 21.

What we claim is:

1. Apparatus for extrusion of continuous lengths of plastic from a thermoplastic material comprising:
   (a) a screw and barrel arrangement for plasticising and conveying a continuous unbroken stream of the thermoplastic material,
   (b) an extruder nozzle and a housing for the nozzle, the nozzle being mounted in the housing and including a nozzle duct for issuance of the extrusion from the apparatus, the housing being formed about the nozzle to provide an annular passageway extending from opposite the outlet end of the nozzle duct rearwardly opposite the direciton of issuance of the extrusion and turning inwardly toward the nozzle duct, the housing including a mandrel defining with the nozzle a conically shaped annular passageway communicating at the radially outward end thereof with inwardly turning end of the first mentioned annular passageway and leading to the inlet of the nozzle duct,
   (c) a supply duct interconnecting the screw and barrel arrangement and the first mentioned annular passageway for delivery of plasticized thermoplastic material to the first mentioned annular passageway opposite the outlet end of the nozzle duct for passage of the plasticised thermoplastic material around the extruder nozzle and then rearwardly toward said inwardly turning portion of the first mentioned annular passageway.

2. Apparatus according to claim 1, said extruder nozzle having a bead at its rearwardly disposed end defining a deflecting edge in the first mentioned annular passageway at said inwardly turning part thereof.

3. Apparatus according to claim 1, the cross section of the inwardly turned portion of the first mentioned annular passageway being adjustable.

4. Apparatus according to claim 1, the extruder nozzle being axially adjustable permitting adjusting the cross section of said conically shaped annular passageway.

5. Apparatus according to claim 1, the mandrel having a bore for delivery of an elongated member to the nozzle duct for covering of the elongated member by the thermoplastic material.

6. Apparatus according to claim 5, and means for extruding said elongated member through said bore of the mandrel.

7. Apparatus according to claim 6, and means for radially adjusting the position of the nozzle in the housing.

8. Apparatus according to claim 7, the extruder nozzle being axially adjustable permitting adjusting the cross section of said conically shaped annular passageway.

9. Apparatus according to claim 1, and means for radially adjusting the position of the nozzle in the housing.

10. Apparatus according to claim 4, and means for radially adjusting the position of the nozzle in the housing.

11. Apparatus according to claim 1, and means for heating the supply duct to maintain the thermoplastic material in plasticised condition.

12. Apparatus according to claim 1, said supply duct, said passageways and said nozzle duct being for receiving and conveying an unbroken stream of the plasticised thermoplastic material, respectively, from the screw and barrel arrangement and to the extruder nozzle.

13. Process for the extrusion of continuous lengths of plastic from a thermoplastic material comprising plasticising the thermoplastic material with a screw and barrel arrangement to provide a continuous stream of the plasticised thermoplastic material, forcing the plasticised thermoplastic material with the screw and barrel arrangement through a passageway terminating in a nozzle having a nozzle duct through which the plasticised thermoplastic material passes and from which the extrusion issues, said passageway passing from the screw and barrel arrangement to the nozzle opposite the outlet end of the nozzle duct, around the nozzle and rearwardly opposite the direction of issuance of the extrusion from the nozzle duct, then turning inwardly toward the nozzle duct into a conically shaped annular duct leading to the nozzle duct inlet, for passage of the plasticised thermoplastic material around the nozzle, then rearwardly along the nozzle and to the nozzle duct.

14. Process according to claim 13, and periodically changing the quantity of plasticised thermoplastic material supplied to the nozzle duct for extrusion of lengths having a periodically changing cross section.

15. Process according to claim 13, passing an elongated member through the nozzle duct and covering of the elongated member by the thermoplastic material.

16. Process according to claim 15 in which the elongated member is a prefabricated member.

17. Process according to claim 15, and extruding the elongated member immediately before the covering thereof in the nozzle duct.

18. Process according to claim 15, and successively covering the elongated member with a plurality of plasticised thermoplastic matterial coverings.

19. Process according to claim 15, wherein the elongated member is adapted for use as the marking element of a writing instrument on which a point can be formed.

20. Process according to claim 16, wherein the elongated member is adapted for use as the marking element of a writing instrument on which a point can be formed.

References Cited

UNITED STATES PATENTS

| | | | |
|---|---|---|---|
| 3,054,142 | 9/1962 | Hinderer et al. | 264—174 |
| 3,170,968 | 2/1965 | Rokunohe et al. | 264—174 |
| 3,229,012 | 1/1966 | Garner | 264—174 |
| 3,266,093 | 8/1966 | Corbett | 264—174 |
| 3,318,987 | 5/1967 | Fitzgerald | 264—171 |
| 3,432,588 | 3/1969 | Breidt et al. | 264—171 |
| 3,485,912 | 12/1969 | Schrenk et al. | 264—171 |
| 3,511,903 | 5/1970 | Glass et al. | 264—171 |
| 3,549,735 | 12/1970 | Moss | 264—176 R |
| 3,555,128 | 1/1971 | Schrenk | 264—176 R |
| 3,584,095 | 6/1971 | Heider et al. | 264—176 R |
| 2,688,154 | 9/1954 | Huckfeldt | 264—209 |
| 3,249,670 | 5/1966 | Rottner et al. | 264—209 |
| 3,275,731 | 9/1966 | Kosinsky | 264—176 R |

JAY H. WOO, Primary Examiner

U.S. Cl. X.R.

264—167, 171, 174; 425—133, 461, 467